(12) United States Patent
Guillou et al.

(10) Patent No.: US 10,473,325 B2
(45) Date of Patent: Nov. 12, 2019

(54) PLANT AND METHOD FOR CHEMICAL LOOPING OXIDATION-REDUCTION COMBUSTION OF A GASEOUS HYDROCARBON FEEDSTOCK WITH CATALYTIC PRE-REFORMING OF THE FEED

(71) Applicants: IFP Energies nouvelles, Rueil-Malmaison (FR); Total Raffinage Chimie, Courbevoie (FR)

(72) Inventors: Florent Guillou, Ternay (FR); Beatrice Fischer, Lyons (FR); Tiago Sozinho, Feyzin (FR); Ann Cloupet, Longes (FR); Stephane Bertholin, Chaponost (FR); Mahdi Yazdanpanah, Le Havre (FR); Hélène Stainton, Lyons (FR)

(73) Assignees: IFP ENERGIES NOUVELLES, Rueil-Malmaison (FR); TOTAL RAFFINAGE CHIMIE, Courbevoie (FR)

( * ) Notice: Subject to any disclaimer, the term of this patent is extended or adjusted under 35 U.S.C. 154(b) by 172 days.

(21) Appl. No.: 15/535,004

(22) PCT Filed: Dec. 1, 2015

(86) PCT No.: PCT/EP2015/078243
§ 371 (c)(1),
(2) Date: Jun. 9, 2017

(87) PCT Pub. No.: WO2016/091665
PCT Pub. Date: Jun. 16, 2016

(65) Prior Publication Data
US 2017/0321886 A1    Nov. 9, 2017

(30) Foreign Application Priority Data
Dec. 12, 2014    (FR) .................... 14 62319

(51) Int. Cl.
F23D 3/40 (2006.01)
F23C 10/01 (2006.01)
(Continued)

(52) U.S. Cl.
CPC ............... F23C 10/01 (2013.01); B01J 8/065 (2013.01); B01J 8/067 (2013.01); B01J 8/24 (2013.01);
(Continued)

(58) Field of Classification Search
CPC .................................. B01J 8/065; F23C 10/00
See application file for complete search history.

(56) References Cited

U.S. PATENT DOCUMENTS 2,683,657 A * 7/1954 Garbo ................. C10J 3/482
                                                    422/146
4,372,755 A    2/1983 Tolman et al.
(Continued)

FOREIGN PATENT DOCUMENTS

CN    101576253 A    11/2009
FR    2941689 A1    8/2010

OTHER PUBLICATIONS

International Search Report for PCT/EP2015/078243 dated Feb. 10, 2016; English translation submitted herewith (7 Pages).

*Primary Examiner* — Jason Lau
(74) *Attorney, Agent, or Firm* — Fitch, Even, Tabin & Flannery, L.L.P.

(57) ABSTRACT

The invention relates to a plant and to a method for chemical looping oxidation-reduction combustion of a gaseous hydrocarbon feed, for example natural gas essentially containing methane. According to the invention, catalytic pre-reforming of the feed is performed in a pre-reforming zone comprising a fixed reforming catalyst, while benefiting from a heat transfer between the reduction or oxidation zone of the (Continued)

chemical loop and the pre-reforming zone adjoining the reduction or oxidation zone. Pre-reforming zone (130) and oxidation zone (110) or pre-reforming zone (130) and reduction zone (120) are thus thermally integrated within the same reactor (100) while being separated by at least one thermally conductive separation wall (140).

17 Claims, 3 Drawing Sheets

(51) Int. Cl.
*B01J 8/24* (2006.01)
*F23C 10/00* (2006.01)
*F23C 10/20* (2006.01)
*B01J 8/06* (2006.01)
*C01B 3/40* (2006.01)
*F23C 10/04* (2006.01)
*F23C 10/22* (2006.01)

(52) U.S. Cl.
CPC .............. *C01B 3/40* (2013.01); *F23C 10/005* (2013.01); *F23C 10/04* (2013.01); *F23C 10/20* (2013.01); *F23C 10/22* (2013.01); *B01J 2208/00495* (2013.01); *B01J 2208/00504* (2013.01); *B01J 2208/00911* (2013.01); *B01J 2208/065* (2013.01); *C01B 2203/0233* (2013.01); *C01B 2203/0238* (2013.01); *C01B 2203/0822* (2013.01); *C01B 2203/1058* (2013.01); *C01B 2203/1241* (2013.01); *F23C 2900/99008* (2013.01); *Y02E 20/346* (2013.01)

(56) References Cited

U.S. PATENT DOCUMENTS

| | | | |
|---|---|---|---|
| 5,447,024 A | 9/1995 | Ishida et al. | |
| 2002/0159929 A1* | 10/2002 | Kaneko | C07C 29/152 422/140 |
| 2004/0244289 A1* | 12/2004 | Morozumi | C01B 3/323 48/77 |
| 2011/0303875 A1* | 12/2011 | Hoteit | C01B 3/42 252/373 |
| 2014/0219895 A1 | 8/2014 | Moghtaderi et al. | |

* cited by examiner

FIG. 6
ART ANTERIEUR

PLANT AND METHOD FOR CHEMICAL LOOPING OXIDATION-REDUCTION COMBUSTION OF A GASEOUS HYDROCARBON FEEDSTOCK WITH CATALYTIC PRE-REFORMING OF THE FEED

CROSS-REFERENCE TO RELATED APPLICATIONS

This application is a U.S. national phase application filed under 35 U.S.C. § 371 of International Application No. PCT/EP2015/078243, filed Dec. 1, 2015, designating the United States, which claims priority from French Patent Application No. 14/62.319, filed Dec. 12, 2014, which are hereby incorporated herein by reference in their entirety for all purposes.

FIELD OF THE INVENTION

The present invention relates to the field of chemical looping oxidation-reduction combustion (CLC) of hydrocarbons, in particular to the combustion of gaseous hydrocarbons such as methane.

BACKGROUND OF THE INVENTION

Chemical looping combustion or CLC: in the text hereafter, what is referred to as CLC (Chemical Looping Combustion) is an oxidation-reduction or redox looping method on an active mass. It can be noted that, in general, the terms oxidation and reduction are used in connection with the respectively oxidized or reduced state of the active mass. The oxidation reactor is the reactor where the redox mass is oxidized and the reduction reactor is the reactor where the redox mass is reduced.

Within a context of increasing world energy demand, capture of carbon dioxide ($CO_2$) for sequestration thereof has become an indispensable means to limit greenhouse gas emissions harmful to the environment. The Chemical Looping Combustion (CLC) process allows to produce energy from hydrocarbon-containing fuels while facilitating capture of the $CO_2$ emitted upon combustion.

CLC consists in implementing redox reactions of an active mass, typically a metal oxide, for splitting the combustion reaction into two successive reactions. A first oxidation reaction of the active mass, with air or a gas acting as the oxidizer, allows the active mass to be oxidized. This reaction is highly exothermic and it generally develops more energy than the combustion of the feed. A second reduction reaction of the active mass thus oxidized, by means of a reducing gas, then allows to obtain a reusable active mass and a gas mixture essentially comprising $CO_2$ and water, or even syngas containing hydrogen ($H_2$) and nitrogen monoxide (CO). This reaction is generally endothermic. This technique thus enables to isolate the $CO_2$ or the syngas in a gas mixture practically free of oxygen and nitrogen.

The balance of the chemical looping combustion, i.e. of the two previous reactions, is globally exothermic and it corresponds to the heating value of the treated feed. It is possible to produce energy from this process, in form of vapour or electricity, by arranging exchange surfaces in the active mass circulation loop or on the gaseous effluents downstream from the combustion or oxidation reactions.

U.S. Pat. No. 5,447,024 describes for example a chemical looping combustion method comprising a first reactor for reduction of an active mass using a reducing gas and a second oxidation reactor allowing to restore the active mass in its oxidized state through an oxidation reaction with wet air. The circulating fluidized bed technology is used to enable continuous change of the active mass from the oxidized state to the reduced state thereof.

The active mass going alternately from the oxidized form to the reduced form thereof, and conversely, follows a redox cycle.

Thus, in the reduction reactor, active mass ($M_xO_y$) is first reduced to the state $M_xO_{y-2n-m/2}$ by means of a hydrocarbon $C_nH_m$ that is correlatively oxidized to $CO_2$ and $H_2O$, according to reaction (1), or optionally to a mixture $CO+H_2$, depending on the proportions used.

$$C_nH_m + M_xO_y \rightarrow nCO_2 + m/2 H_2O + M_xO_{y-2n-m/2} \quad (1)$$

In the oxidation reactor, the active mass is restored to its oxidized state ($M_xO_y$) on contact with air according to reaction (2), prior to returning to the first reactor.

$$M_xO_{y-2n-m/2} + (n+m/4)O_2 \rightarrow M_xO_y \quad (2)$$

In the above equations, M represents a metal.

The efficiency of the circulating fluidized bed chemical looping combustion (CLC) method is based to a large extent on the physico-chemical properties of the redox active mass.

The reactivity of the redox pair(s) involved and the associated oxygen transfer capacity are parameters that influence the dimensioning of the reactors and the rates of circulation of the particles. The life of the particles depends on the mechanical strength of the particles and on the chemical stability thereof.

In order to obtain particles usable for this process, the particles involved generally consist of a redox pair selected from among $CuO/Cu$, $Cu_2O/Cu$, $NiO/Ni$, $Fe_2O_3/Fe_3O_4$, $FeO/Fe$, $Fe_3O_4/FeO$, $MnO_2/Mn_2O_3$, $Mn_2O_3/Mn_3O_4$, $Mn_3O_4/MnO$, $MnO/Mn$, $Co_3O_4/CoO$, $CoO/Co$, or of a combination of some of these redox pairs, and sometimes of a binder providing the required physico-chemical stability.

The NiO/Ni pair is often mentioned as the reference active mass for the CLC process due to its oxygen transport capacities and its fast reduction kinetics, notably in the presence of methane, despite the high toxicity of nickel oxide (it is classified as a CMR1 substance: Carcinogenic, Mutagenic or toxic for Reproduction of class 1), leading notably to significant constraints on the fumes filtration system, and despite its high cost. Indeed, since nickel oxide does not occur in the natural state with a sufficient concentration to allow interesting properties for the CLC process to be obtained, it is generally used concentrated in synthetic active mass particles whose manufacturing cost is high.

More generally, a major issue raised by the implementation of a CLC process is the cost of the active mass. Since the CLC process requires circulation of the solid in reactors where gas velocities are relatively high, continuous consumption of the solid through attrition cannot be prevented. If the cost of the active mass is relatively high, the make-up active mass item can become a significant part of the operating cost. This is particularly the case for synthetic particles whose manufacturing cost is high.

It is therefore important to find an inexpensive active mass in order to reduce the impact of the cost of the particles on the price of $CO_2$ capture through CLC.

Besides, the use of natural ores as active mass for the CLC process, such as ilmenite or manganese ores, which can provide a satisfactory solution in terms of cost, is known.

However, the use of such ores is generally less suited for combustion of gas feeds such as methane than for the combustion of solid or liquid feeds, in terms of process performance.

There is therefore a need for an efficient CLC process, notably in terms of feed conversion, suited to the treatment of a gaseous hydrocarbon feed and that can use an inexpensive material as the redox active mass, complying with environmental standards in terms of toxicity and reducing emissions.

SUMMARY OF THE INVENTION

In order to notably meet this need, the applicants have developed a reactor comprising two thermally integrated zones: a pre-reforming zone for the gas feed and the reduction zone, or the oxidation zone, of the chemical combustion loop.

Using such a reactor in the CLC process allows to convert all or part of the gaseous hydrocarbon feed to syngas ($CO+H_2$) in the pre-reforming zone prior to its combustion in the reduction zone, using the reaction heat from the CLC loop. The reaction kinetics of the syngas with the oxygen carrier being higher than that of the gaseous hydrocarbon feed with the oxygen carrier, the CLC process performances are improved. Besides, the syngas having good reactivity with most oxygen-carrying materials, in particular with inexpensive ores, it is then possible to minimize the costs related to the redox active mass while providing an efficient CLC process in terms of feed conversion ratio. Indeed, despite the fact that ores do generally not have sufficient catalytic activity to induce in-situ reforming of the hydrocarbon feed, i.e. reforming in the reduction zone, as would be the case with nickel oxide for example, the present invention however allows to effectively ensure reforming of the feed.

Thus, according to a first aspect, the present invention relates to a plant for chemical looping oxidation-reduction combustion of a gaseous hydrocarbon feed, comprising:
- a pre-reforming zone comprising an inlet for the gaseous hydrocarbon feed, a feed point for an oxidizing reforming gas, an outlet for a gas mixture comprising syngas and a fixed catalyst for the reforming reaction,
- a reduction zone provided with means of injecting a fluidization gas, a feed point for said gas mixture, an inlet for a redox active mass in form of particles and an outlet for a gaseous effluent and for said redox active mass,
- an oxidation zone provided with a feed point for said redox active mass from the reduction zone, means of injecting an oxidizing fluidization gas, and an outlet for a depleted oxidizing gas and for said redox active mass, wherein said pre-reforming zone and said oxidation zone or said pre-reforming zone and said reduction zone are thermally integrated in the same reactor while being separated by at least one thermally conductive separation wall.

According to an embodiment of the invention, the reactor comprises the pre-reforming zone and the reduction zone.

According to another embodiment of the invention, the reactor comprises the pre-reforming zone and the oxidation zone.

According to an embodiment of the invention, the reactor comprises at the centre thereof said reduction zone or said oxidation zone surrounded by a rigid casing, said casing consisting, from the centre to the periphery of the reactor, of a first layer made of a thermally conductive anti-abrasion material and of a second layer made of a refractory material, said pre-reforming zone being integrated in said casing.

According to a variant of this embodiment, the thermally conductive separation wall comprises at least the first layer of the reactor casing.

According to another variant of this embodiment, the pre-reforming zone comprises at least one enclosure delimited by a wall consisting of a first part in contact with the reduction zone and of a second part in contact with the first or second layer of the reactor casing, and wherein the first part in contact with the reduction zone makes up the thermally conductive separation wall.

According to this embodiment, the pre-reforming zone can comprise a set of metal tubes arranged vertically around the reduction/oxidation zone.

According to an embodiment of the invention, the pre-reforming zone is integrated in the fluidization gas injection means of the reduction zone, and it preferably consists of a fluidization gas injection ring.

According to an embodiment of the invention, the reforming reaction catalyst is a fixed bed of a catalyst in form of particles, such as a catalyst comprising nickel.

According to an embodiment of the invention, the reforming reaction catalyst is a fixed internal contained in the pre-reforming zone, such as a nickel foam or a set of fins or baffles arranged on an inner face of the pre-reforming zone.

Preferably, the thermally conductive wall has a thermal conductivity greater than 0.1 W/(m·K), preferably greater than 1 W/(m·K).

According to a second aspect, the invention relates to a method for chemical looping oxidation-reduction combustion of a gaseous hydrocarbon feed implemented in the plant according to the invention, comprising:
- sending the gaseous hydrocarbon feed to a pre-reforming zone comprising a fixed catalyst so as to perform catalytic reforming of said hydrocarbon feed on contact with an oxidizing reforming gas such as steam or $CO_2$ and to produce a gas mixture comprising syngas,
- sending said gas mixture to a fluidized-bed reduction zone to perform combustion of said gas mixture on contact with a redox active mass in form of particles,
- oxidizing the redox active mass particles from the reduction zone by contacting with an oxidizing gas stream in a fluidized-bed oxidation zone, and
- transferring the heat of the fluidized bed from the reduction zone or the oxidation zone to the pre-reforming zone by means of at least one thermally conductive wall separating said pre-reforming zone from said reduction zone or said oxidation zone.

Preferably, the temperature of the fluidized bed in the reduction zone and in the oxidation zone, circulating between said reduction and oxidation zones, ranges between 700° C. and 1100° C., and the heat transferred from said fluidized bed to the pre-reforming zone is such that the temperature in said pre-reforming zone is favourable to the catalytic reforming reaction of the gaseous hydrocarbon feed, said temperature preferably ranging between 650° C. and 1000° C.

According to an embodiment of the invention, heat transfer is achieved from the reduction zone to the pre-reforming zone, and the oxidizing reforming gas, the gaseous hydrocarbon feed and possibly an additional fluidization gas are sent to fluidization means of the reduction zone, preferably a gas injection ring, and reforming of said feed is performed within said fluidization means that make up the pre-reforming zone.

Preferably, the gaseous hydrocarbon feed essentially comprises methane, and reforming of the feed within the pre-reforming zone is operated in the presence of a methane reforming catalyst comprising nickel.

BRIEF DESCRIPTION OF THE FIGURES

Other features and advantages of the invention will be clear from reading the description hereafter of embodiments given by way of non limitative example, with reference to the accompanying figures wherein.

In the figures, the same reference numbers designate identical or similar elements.

DETAILED DESCRIPTION OF THE INVENTION

It can be noted that, in the present description, what is referred to as "pre-reforming" of the gaseous hydrocarbon feed is reforming conducted upstream from the reduction zone, as opposed to in-situ reforming, understood to be here reforming of the feed within the reduction zone. It is reminded that the reduction zone must be understood here, in connection with the definition of the CLC process given above, as the reaction zone where the redox mass is reduced. The reforming reaction is detailed below in connection with the description of FIG. 1.

In the present description, the expressions "oxygen-carrying material", "oxygen carrier" and "redox active mass" are equivalent. The redox mass is referred to as active in connection with the reactive capacities thereof, in the sense that it is capable of acting as an oxygen carrier in the CLC process by capturing and releasing oxygen. The abbreviated expression "active mass" or the term "solid" can also be used.

In the CLC method according to the invention, the hydrocarbon feeds used are gaseous hydrocarbon feeds, preferably consisting essentially of methane, for example natural gas or a biogas.

Figure 1:
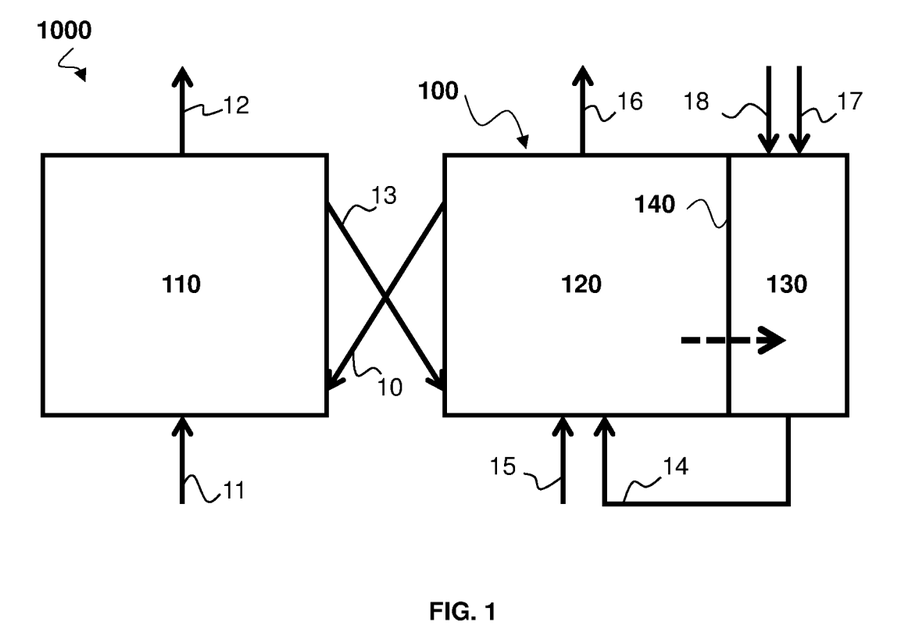
FIG. 1 schematically shows a CLC plant according to a first embodiment of the invention, comprising a reduction zone and a pre-reforming zone integrated in a reactor, FIG. 2 schematically shows a CLC plant according to a second embodiment of the invention, comprising an oxidation zone and a pre-reforming zone integrated in a reactor.

FIG. 1 is a simplified block diagram of the CLC plant according to a first embodiment of the invention.

Chemical looping combustion plant 1000 comprises an oxidation zone 110, also referred to as oxidation reactor or "air reactor", whose function is to oxidize an oxygen carrier 10 in form of particles, coming from a reduction zone 120, also referred to as reduction reactor or "fuel reactor", whose function is to achieve reduction of the oxygen carrier on contact with a gas feed so as to release the oxygen of the carrier and to perform combustion of the feed. The two reactors are operated in fluidized bed mode, and the oxygen carrier circulates between the two zones so as to form the chemical looping combustion loop. The arrows between reaction zones 110 and 120 schematically show the transport lines wherein oxygen carrier (10, 13) circulates. It is understood that these transport lines can comprise various devices among which, by way of non exhaustive example, solid flow control devices such as valves, gas/solid separation devices, elutriation devices, heat exchange devices, or other sealing elements such as siphons.

Oxygen carrier 10 from reduction zone 120 is in an entirely or partly reduced state and it reacts, within oxidation zone 110, on contact with an oxidizing gas stream 11, such as air, according to reaction (2) described above. This results in an oxidizing gas stream depleted in oxygen 12, depleted air for example, and an oxygen-carrying solid stream oxidized again 13. Oxygen-depleted oxidizing gas stream 12 and solid stream 13 are generally discharged at the top of the oxidation zone through the same outlet, and then sent to at least one gas/solid separation device (not shown) allowing gas stream 12 to be separated from solid stream 13 that is again sent to reduction zone 120. The oxidation zone is thus provided with a feed point for the oxygen carrier from reduction zone 120, injection means for oxidizing gas 11 allowing fluidization of the carrier particles, a discharge means for an oxygen-depleted oxidizing gas 12 and oxidized oxygen carrier 13.

Oxygen-carrying solid 13 is sent to reduction zone 120. The purpose of this zone is to achieve combustion of a fuel consisting of a gas feed 14 by contacting this feed with oxygen carrier 13 that releases, by reduction of the carrier, the oxygen acting as an oxidizer. The global reaction is reaction (1) described above. More in detail, in the case of gaseous hydrocarbon feed conversion in a CLC process, as in the present invention, two steps can be distinguished. First, the hydrocarbon molecule is converted to a syngas on the oxygen carrier according to Equation (3), then the syngas formed is oxidized on the oxygen carrier to CO and $H_2$ according to Equations (4) and (5). The syngas conversion reactions according to Equations (4) and (5) exhibit very high kinetics in comparison with the formation reaction of this syngas according to Equation (3).

$$C_nH_m + nM_xO_y \rightarrow nCO + \frac{m}{2}H_2 + nM_xO_{y-1} \quad (3)$$

$$CO + M_xO_y \rightarrow CO_2 + M_xO_{y-1} \quad (4)$$

$$H_2 + M_xO_y \rightarrow H_2O + M_xO_{y-1} \quad (5)$$

Reduction zone 120 is fed with a fluidization gas 15, typically steam, whose function can also be to favour conversion of the feed. The fluidization gas can also be $CO_2$ or a mixture of steam and $CO_2$. The reactions in this reduction zone 120 result in a stream of fumes 16 comprising nearly exclusively $CO_2$ and $H_2O$, intended for $CO_2$ capture and storage, and a stream of reduced oxygen-carrying solid 10 intended to be sent to oxidation zone 110 to be oxidized again, thus looping the loop of the chemical looping combustion. Fumes 16 and solid stream 10 are generally discharged at the top of the reduction zone through the same outlet, then sent to a gas/solid separation device (not shown) allowing fumes 16 to be separated from the solid stream that is sent back to oxidation zone 110. Reduction zone 120 thus comprises means for injecting fluidization gas 15, a gaseous fuel feed point, an inlet for oxygen carrier 13, and a discharge point for gaseous effluent 16 produced upon combustion and for reduced oxygen carrier 10.

The temperature of the oxidation zone fluidized bed generally ranges between 700° C. and 1100° C. The oxygen carrier transferred to reduction zone 120 is also operated in fluidized bed mode at a temperature generally ranging between 700° C. and 1100° C. Typically, the reaction times required for the reduction reactions, as well as the oxidation reactions in the oxidation reactor, depend on the nature of the feeds treated and of the metal oxides used, and they can range from one second to about ten minutes. For the combustion of gas feeds according to the invention, the contact time in the reduction zone typically ranges between 1 second and 1 minute, preferably between 1 and 20 seconds. The ratio of the amount of circulating active mass to the amount of oxygen to be transferred between the two reaction zones advantageously ranges between 30 and 100, preferably between 40 and 70.

The CLC process typically operates at low pressure. This low pressure favours reforming reactions and it allows for example to minimize the gas compression energy cost, if necessary, for example for the air used in the oxidation reactor, and thus to maximize the energy efficiency of the plant.

The balance of the heat of the reactions conducted in zones 110 and 120 is equal to the heating value of feed 14, in the same way as if combustion thereof had been performed in a conventional combustion process.

According to the invention, at least part of this heat capacity is advantageously used to conduct a catalytic reforming reaction of the gaseous hydrocarbon feed prior to sending it to reduction zone 120 of the chemical loop.

Thus, a third reaction zone 130 is provided in the CLC plant and it is designed for catalytic reforming of all or part of raw gaseous hydrocarbon feed 17. It consists, in zone 130, in contacting hydrocarbon gaseous feed 17, in admixture with a gas having oxidizing properties 18, such as steam or $CO_2$, and a suitable catalyst. The catalytic reforming reaction enables formation of syngas ($H_2$+CO), for example according to Equation (6) below, with steam; it is also referred to as steam reforming reaction. The reaction according to Equation (7) below with $CO_2$ (reforming known as "dry") can also occur.

$$C_nH_m + nH_2O \xrightleftharpoons{Catalyst} nCO + \left(n + \frac{m}{2}\right)H_2 \qquad (6)$$

$$C_nH_m + nCO_2 \xrightleftharpoons{Catalyst} 2nCO + \frac{m}{2}H_2 \qquad (7)$$

Gas feed 14 sent to reduction zone 120 is then enriched in syngas in relation to raw hydrocarbon feed 17, which allows to improve the global kinetics of conversion of the feed to steam and $CO_2$ on contact with the redox active mass in the reduction zone (see Equations 3, 4, 5 above). Feeding a specific fluidization gas 15 can be optional if oxidizing gas stream 18, e.g. steam, is such that it allows to provide fluidization in zone 120 when feed 14 comprising the syngas produced by reforming, residual raw hydrocarbon feed 17 and unreacted oxidizing gas 18 is sent to zone 120.

The steam sent to zone 130 as oxidizing gas 18 for the reforming reaction may have been generated in heat exchange zones within the CLC plant, for example in a heat exchanger positioned on the path of the redox active mass in the loop, such as on a transport line between the oxidation and reduction reactors, or in heat exchange zones downstream from the CLC loop, on contact with fumes 12. The water can be external to the process, or it can for example come from the condensation of fumes 12. If $CO_2$ is used as oxidizing gas 18 in zone 130, it can come from fumes 12 and be extracted therefrom in the $CO_2$ compression chain designed for transport/storage, arranged downstream from reduction zone 120. A mixture of water and of $CO_2$ can also be used as oxidizing gas 18 and it can for example result from the recycle of fumes 12 at the reduction zone outlet.

Any type of catalyst suited for reforming of the gaseous hydrocarbon feed, generally well known to the person skilled in the art, can be used. By way of non limitative example, a catalyst with a nickel-based active phase is used for reforming of a feed predominantly comprising methane on contact with steam, according to the well known steam methane reforming (SMR) reaction. This reaction is strongly endothermic and it requires energy supply. In conventional industrial processes dedicated to reforming, two energy supply modes are generally applied: either introduction of free oxygen into the reaction medium to provide partial oxidation of the feed whose exotherm compensates for the endothermicity of the reforming reaction (autothermal reforming), or external heating.

According to the present invention, the heat produced by the CLC loop, wherein the temperature of the circulating fluidized bed ranges between 700° C. and 1100° C., is used to provide the energy required for the catalytic reforming reaction. The temperature levels of the circulating fluidized bed are indeed compatible with the conventional operating temperatures of catalytic reforming reactions. Typically, the temperature of the catalytic reforming reaction in zone 130 ranges between 650° C. and 1000° C., preferably between 700° C. and 900° C.

Reduction zone 120 and pre-reforming zone 130 are therefore thermally integrated in the same reactor 100 while being separated by a thermally conductive separation wall 140. The presence of such a heat exchange surface allows to induce heat transfer from reduction zone 120 to pre-reforming zone 130, shown by an arrow between the two zones in FIG. 1. This heat transfer is not penalizing for the CLC process because the global heat balance of the chemical looping combustion, including pre-reforming, i.e. the balance of the reaction heats in reaction zones 110, 120 and 130, corresponds to the heating value of raw hydrocarbon feed 17.

Thermally conductive wall 140 preferably has a thermal conductivity above 0.1 W/(m·K), preferably above 1 W/(m·K). This wall can be multiple by consisting for example of a wall specific to each one of the two reaction zones and delimiting each reaction zone as such, i.e. two walls. A representation example for such a case is given in FIG. 3 described below. The thermally conductive wall can also be multiple insofar as it consists of several distinct materials, for example in form of successive layers of distinct nature.

The redox mass can consist of metal oxides such as, for example, Fe, Ti, Ni, Cu, Mn, Co, V oxides, alone or in admixture, which can be extracted from ores, ilmenite ($FeTiO_3$) for example or a natural manganese ore such as pyrolusite ($MnO_2$), or be synthetic (for example iron oxide particles supported on alumina $Fe_2O_3/Al_2O_3$), with or without a binder, and it has the required redox properties and the characteristics necessary for performing fluidization.

Advantageously, the redox mass is obtained from ores, generally less expensive than synthetic particles. According to the invention, pre-reforming actually allows this type of active mass to be used since the syngas resulting from reforming exhibits good reactivity with most oxygen-carrying materials. The ore can be previously crushed and screened in order to obtain an active mass of grain size compatible with fluidized-bed operation.

The oxygen storage capacity of the redox mass advantageously ranges, depending on the material type, between 1 and 15 wt. %. Advantageously, the amount of oxygen effectively transferred by the metal oxide ranges between 1 and 3 wt. %, which allows only a fraction of the oxygen transfer capacity, ideally less than 30% thereof, to be used so as to limit risks of mechanical aging or particle agglomeration. Using a fraction only of the oxygen transport capacity also affords the advantage that the fluidized bed acts as a thermal ballast and thus smoothes the temperature variations imposed by the reactions.

The active mass comes in form of fluidizable particles belonging to groups A or B of Geldart's classification. By way of non-limitative example, the redox active mass particles can belong to group B of Geldart's classification, with a grain size such that over 90% of the particles have a size ranging between 50 μm and 500 μm (Sauter mean diameter), preferably between 100 μm and 300 μm, for a density ranging between 1000 kg/m$^3$ and 6000 kg/m$^3$, preferably between 1500 kg/m$^3$ and 5000 kg/m$^3$.

The redox active mass can be subjected to an activation step so as to increase the reactive capacities thereof; it can consist of a temperature rise phase, preferably progressive, and preferably in an oxidizing atmosphere, in air for example.

Figure 2:
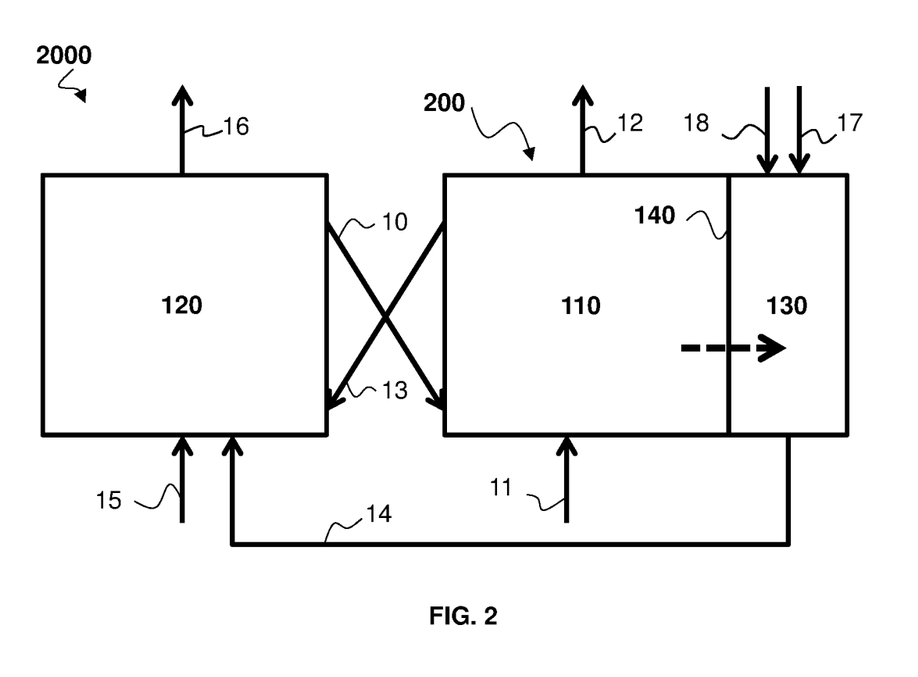

FIG. 2 shows a simplified block diagram of the CLC plant according to a second embodiment of the invention.

CLC plant 2000 is identical to the plant described in connection with FIG. 1, except that here oxidation zone 110 and pre-reforming zone 130 are the ones integrated in the same reactor 200, instead of reduction zone 120 and pre-reforming zone 130 as in plant 1000. According to this embodiment, heat transfer occurs from oxidation zone 110 to the pre-reforming zone through the agency of thermally conductive separation wall 140 between the two reaction zones. One advantage of this embodiment is that it enables access to temperatures in oxidation zone 110 generally higher than those encountered in reduction zone 120.

Figure 3:
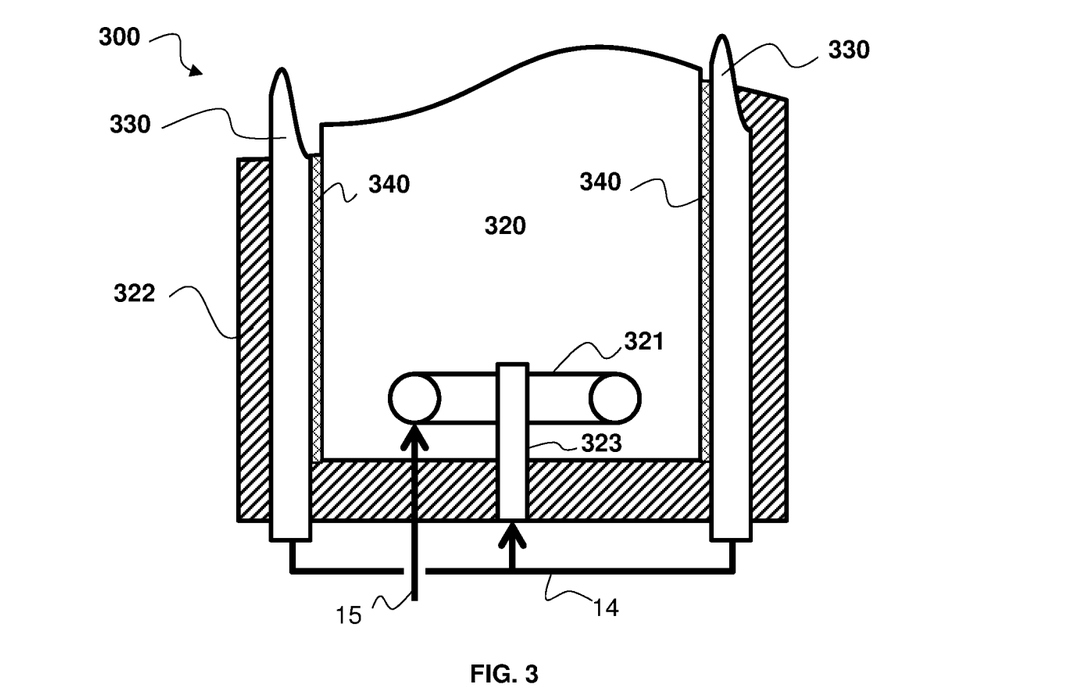
FIG. 3 is a diagram illustrating an example of a reactor according to the first embodiment of the invention.
Figure 4:
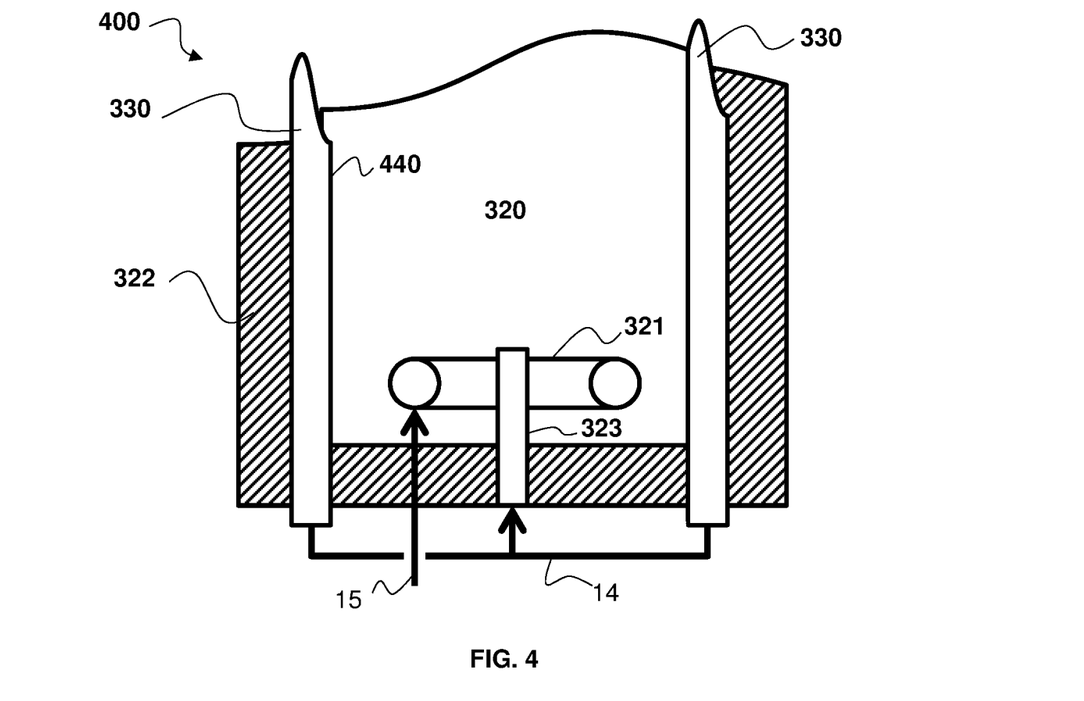
FIG. 4 is a diagram illustrating another example of a reactor according to the first embodiment of the invention.
Figure 5:
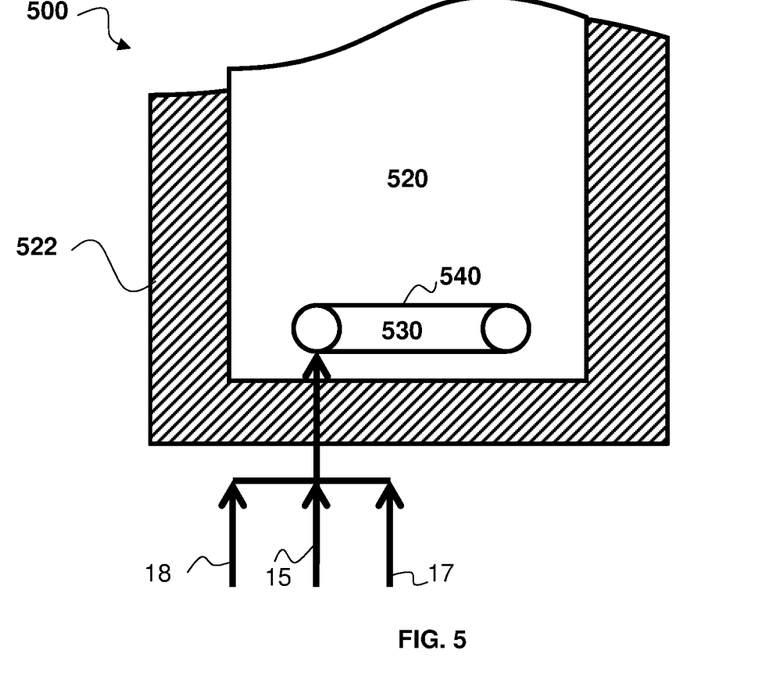
FIG. 5 is a diagram illustrating yet another example of a reactor according to the first embodiment of the invention, and FIG. 6 schematically shows a CLC plant according to the prior art.

FIGS. 3 to 5 are schematic cross-sectional views showing various configurations of the reactor integrating the two pre-reforming/reduction reaction zones of a CLC plant according to the first embodiment of the invention. In these figures, only the lower part of the reactor is shown.

FIG. 3 illustrates an example of a reactor 300 where the pre-reforming zone is embedded in the reactor casing. According to this embodiment, reactor 300 comprises at the centre thereof reduction zone 320 surrounded by a rigid casing. Reduction zone 320 comprises, at the base thereof, a fluidization ring 321 fed with fluidization gas 15. The casing is a structure consisting of several materials that may have different functions. The casing consists, from the centre to the periphery of reactor 300, of a thermally conductive layer 340 made of an anti-abrasion material and of a layer 322 comprising a refractory material.

The material forming layer 322 is a refractory material such as concrete, low-cement concrete, concrete type aluminous products, concrete type alumina-silica products, refractory papers, refractory fiber panels or plies such as rock wool, silica-calcium or silica-magnesia fibers, bulk fibers, or refractory bricks such as alumina (content above 99%) bricks, which can withstand very high temperatures corresponding to the fluidized bed temperatures, i.e. temperatures above 700° C. and even over 1000° C. This layer 322 has a thermal insulation function and it can have variable thickness, for example of the order of 0.01 m to 1 m, depending on the material(s) selected, in order to fulfil its purpose of thermal insulant. This thickness also depends on the temperature acceptable for the reactor wall.

Layer 340 in contact with the fluidized bed of reduction zone 320 fulfils a protective function against the abrasion caused by the circulation of the fluidized bed particles. Typically, layer 340 is made of dense concrete that can comprise a metallic structure forming a network allowing to increase the mechanical strength of the concrete, such as a Hexmesh™ type structure.

Layer 340 allows passage of the heat from reduction zone 320 to pre-reforming zone 330 so as to obtain in zone 330 suitable conditions for the catalytic reforming reaction of the raw hydrocarbon feed (not shown). Preferably, layer 340 has a thermal conductivity above 0.1 W/(m·K), preferably above 1 W/(m·K) at the process temperature.

According to this embodiment, the pre-reforming zone is integrated in the casing of reactor 300 and it is positioned behind anti-abrasion protective layer 340. This configuration allows to preserve the integrity of pre-reforming reactor 330 by not exposing it to the abrasion of the fluidized bed, while hardly penalizing the thermal transfer to zone 330 due to the low thermal transfer resistance of the anti-abrasion layer.

The pre-reforming zone consists for example of a set of cylindrical reactors such as a set of metallic tubes vertically arranged around reduction zone 320. Other pre-reforming reactor shapes integrated in the casing of reactor 300 are possible, such as an annular reactor arranged around reduction zone 320 over the entire height thereof.

In cases where the pre-reforming zone has its own distinct casing, made of metal for example, said casing must also be thermally conductive like anti-abrasion layer 340 so as to make up the thermally conductive wall providing thermal transfer from reduction zone 320 to zone 330.

Gas mixture 14 comprising the gaseous hydrocarbon feed and the syngas produced by reforming in zone 330 is sent from zone 330 to an internal 323 of reduction zone 320 dedicated to its injection into reduction zone 320.

According to another example illustrated in FIG. 4, the reactor is fully identical to the one described in connection with FIG. 3, except that pre-reforming zone 330 is not positioned behind the anti-abrasion layer but it is in contact with the fluidized bed of reduction zone 320. Pre-reforming zone 330, which is not open onto zone 320 and therefore remains a reaction zone distinct from zone 320, comprises at least one enclosure delimited by a wall one part of which is in contact with the fluidized bed of reduction zone 320, and the other part is in contact with refractory material layer 322 and/or the anti-abrasion layer (not shown). Thus, in cases where the pre-reforming zone is a set of metallic tubes vertically arranged around reduction zone 320, part of the tubes is in contact with the fluidized bed in reduction zone 320 and another one is embedded in the casing of reactor 400. The wall of pre-reforming zone 330 in contact with the fluidized bed thus makes up thermally conductive separation wall 440 allowing heat transfer from the fluidized bed of zone 320 to the pre-reforming zone.

According to the present invention, the reactor as illustrated in FIG. 3 or in FIG. 4 can also be the oxidation reactor of the CLC loop, according to the second embodiment described above, integrating the oxidation zone and the pre-reforming zone. The description relative to FIGS. 3 and 4 remains valid for this other configuration, except that reduction zone 320 is replaced by oxidation zone 110, fed through injection ring 321 with air 11 instead of a fluidization gas 15. According to this configuration, the gas mixture comprising the syngas, coming from the pre-reforming zone, is not injected into the oxidation reactor but sent to the reduction zone. Internal 323 is therefore not present.

FIG. 5 shows another example of a reactor where the pre-reforming zone is integrated in the means for injecting the fluidization gas into the reduction zone. This configuration example is possible only in a CLC plant according to the first embodiment of the invention, where the reduction and pre-reforming zones are the ones integrated in the same reactor.

Reactor 500 is identical to the reactor described in connection with FIGS. 3 and 4, except that the pre-reforming zone is not included at least partly in the casing of reactor 500, and it is contained in the fluidization means of reduction zone 520. Thus, pre-reforming zone 530 can be the fluidization gas injection ring. This ring is fed with raw hydrocarbon feed 17 and gas 18 with oxidizing properties, e.g. steam. Gas streams 18 and 17 can be such that they allow fluidization in zone 520 and, in this case, injection of an additional gas 15 for fluidization may be unnecessary. The injection ring can contain internal baffles or metal foam for increasing the contact surface between the reactants and the wall catalyzing the reaction.

In all the described examples of reactors integrating the pre-reforming zone and the reduction or oxidation zone, the reforming catalyst of the pre-reforming zone can come in various forms.

According to a preferred embodiment, the reforming catalyst comes in form of a fixed bed of particles.

The particles can be monometallic catalytic particles supported on various metal oxides such as, by way of non limitative example, alumina $Al_2O_3$, calcium oxide CaO, magnesium oxide MgO, mixed oxides such as $Al_2O_3$—CaO. Preferably, the particles have a nickel base as the active phase and they preferably contain 6 to 25 wt. % nickel, for example on a support predominantly comprising alumina $Al_2O_3$. Such a catalyst comprising nickel supported on alumina is typically used for hydrogen production and it is generally used with excess steam so as to limit the formation of coke on the catalyst. In such a context of industrial hydrogen production, the molar ratio between the steam and the carbon contained in the feed (steam/carbon ratio S/C) generally ranges between 2.5 and 3.5, preferably between 3 and 3.5, in order to guarantee the lifetime of the catalyst. Such conditions are also desirable for pre-reforming according to the invention. For pre-reforming according to the invention, lower S/C ratios can be enough, for example a S/C ratio of at least 1.4.

In cases where $CO_2$ is used as the oxidizing gas for reforming, it is also preferably used in excess, with a molar ratio of oxidizing gas to carbon of the feed equivalent to the aforementioned S/C ratios.

According to another embodiment, the catalyst is a fixed internal contained in the pre-reforming zone, consisting at least partly of metal having a catalytic activity for the reforming reaction, such as a metal foam, a nickel foam for example. Alternatively, the fixed internal can be a set of fins or baffles consisting of said metallic catalyst, for example nickel or an alloy comprising nickel, and arranged on an inner face of the pre-reforming zone.

EXAMPLES

The examples described below are based on process simulations using the Aspen Hysys 8.4 software. The thermodynamic method selected is based on the Soave Redlich Kwong and Lee Kesler models (Soave, Giorgio. "*Equilibrium constants from a modified Redlich-Kwong equation of state*". Chemical Engineering Science 27 (6): 1197-1203; Lee B. I., Kesler M. G., "*A Generalized Thermodynamic Correlation Based on Three-Parameter Corresponding States*", AIChE J., 21(3), 510-527, 1975). The progress of the combustion reactions is based on an extrapolation of experiments conducted at laboratory scale and representative of a CLC process in the case of combustion with pre-reforming of the feed as in the invention (Examples 2 and 3), and in the case of combustion without such pre-reforming, by way of comparison (Example 1).

Example 1 According to the Prior Art

Example 1 is based on the implementation of a conventional chemical looping combustion plant for natural gas combustion, with no feed pre-reforming according to the invention.

Figure 6:
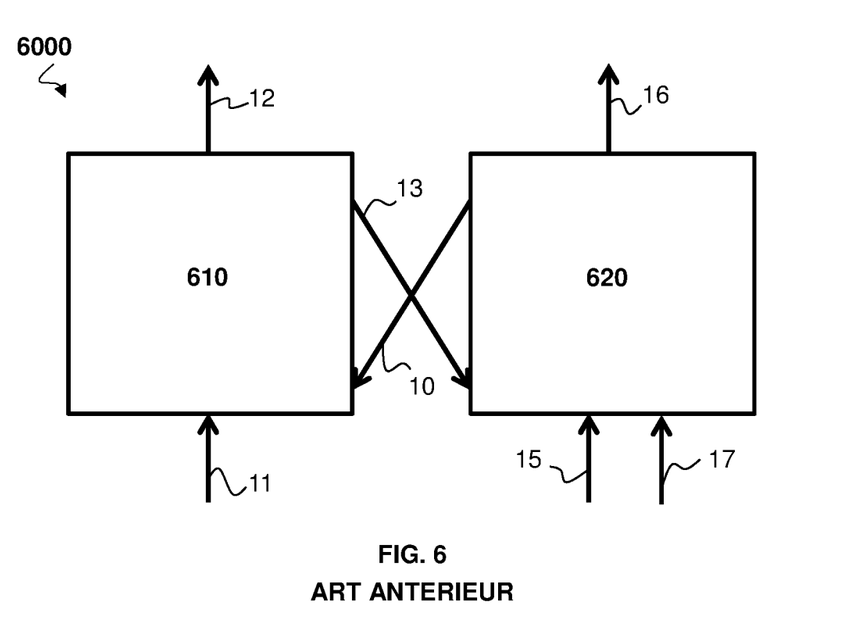

Such a conventional plant is schematically illustrated in FIG. 6. The elements described in connection with FIG. 1 are valid for plant 6000, except for the third feed pre-reforming reaction zone 130 that does not exist in plant 6000. The air 610 and fuel 620 reactors are similar to reaction zones 110 and 120 of FIG. 1.

CLC plant 6000 comprises a fluidized bed consisting of an oxygen-carrying oxide whose active phase is manganese oxide, obtained from a natural ore of pyrolusite type. This oxide has a dynamic oxygen transport capacity corresponding to 1.92 wt. % of its mass.

Combustion of a gaseous hydrocarbon feed 17 of natural gas type, predominantly consisting of methane, is performed. Table 1 below gives the composition of the gaseous hydrocarbon feed (in molar fractions).

TABLE 1

| | |
|---|---|
| Methane | 0.951 |
| Ethane | 0.018 |
| Propane | 0.006 |
| n-Butane | 0.003 |
| n-Pentane | 0.001 |
| Nitrogen | 0.014 |
| Oxygen | 0.000 |
| $H_2O$ | 0.000 |
| Helium | 0.000 |
| Argon | 0.000 |
| Carbon | 0.000 |
| $CO_2$ | 0.008 |
| CO | 0.000 |
| $H_2$ | 0.000 |

In this example, we consider a boiler with a theoretical heating power of 200 MWth, i.e. a yield of the order of 92% and an input power of 217 MWth. This corresponds to the treatment of a hydrocarbon feed stream of the order of 14.9 t/h.

For this feed, a stream 13 of 2943 t/h oxygen-carrying solid is circulated in the plant. It consists, in its most oxidized form entering reduction zone 620, nearly exclusively of $Mn_3O_4$.

A fluidization gas 15, steam here, is delivered to zone 620 at a temperature of 500° C. and at a rate of a 23 t/h for a molar ratio of steam to carbon of 1.4.

Natural gas 17 reacts on contact with the steam and the oxygen-carrying solid. Conversion of the feed on this solid is expected to reach 41% in relation to the methane molar flows, by extrapolating to the industrial scale of the plant.

$$\text{Conversion} = \frac{\dot{n}_{CH_4 feed} - \dot{n}_{CH_4 effluent}}{\dot{n}_{CH_4 feed}} = \frac{832 - 491}{832} = 0.410.$$

This degree of conversion leads to the formation of a gaseous effluent whose composition in molar fractions is given in Table 2 below.

TABLE 2

| | |
|---|---|
| Methane | 0.165 |
| Ethane | 0.000 |
| Propane | 0.000 |
| n-Butane | 0.000 |
| n-Pentane | 0.000 |
| Nitrogen | 0.004 |
| Oxygen | 0.000 |
| H$_2$O | 0.694 |
| Helium | 0.000 |
| Argon | 0.000 |
| Carbon | 0.000 |
| CO$_2$ | 0.137 |
| CO | 0.000 |
| H$_2$ | 0.000 |

A substantial methane fraction thus remains in combustion effluent 16 corresponding to the unconverted feed. This has two consequences on the process. First, the power generated by the boiler is only a fraction of the expected power of 200 MWth with an effective production of the order of 90 MWth, which makes it impossible to maintain the process in temperature satisfactorily with an operating temperature that drops to 798° C. instead of the 900° C. nominal temperature. The fact that this nominal temperature is not reached shows that the effective conversion in a real plant according to this Example 1 would be even less than 41%. The second consequence is that, by carrying out partial conversion, feed is wasted and fumes 16 containing large amounts of gaseous hydrocarbons likely to generate an explosive atmosphere at the plant outlet are produced. Furthermore, under such conditions, it is no longer possible to obtain a CO$_2$ flow rate according to the required specifications by simple water condensation.

Example 2 According to the Invention

This Example 2 is based on a plant as described in connection with FIG. 1. The objectives set out in Example 1, i.e. the desired power, the oxygen carrier and the nature of the treated feed, are the same for Example 2.

Unlike Example 1, we have here a pre-reforming zone 130 whose purpose is to favour conversion of the feed in reactor 620. This zone 130 is fed with reactants through the delivery of 14.9 t/h of a hydrocarbon feed (natural gas) and 23 t/h steam. The S/C ratio is 1.4. This steam is generated in the thermal exchange zones of the process, either on contact with the fumes or in contact with the circulating solid bed. The pre-reforming zone comprises a fixed catalytic bed suited for steam methane reforming whose active phase consists of nickel. The catalyst is made up of Ni/Al$_2$O$_3$ pellets (BASF SG-9301 containing 16.5 wt. % nickel oxide). This zone 130 is operated at 800° C. The steam reforming reactions and mainly those of methane are endothermic. The steam methane reforming reaction and its reaction enthalpy ΔrH are given below:

$$CH_4 + H_2O \rightarrow CO + 3.H_2 \quad \Delta_r H = 205 \text{ kJ/mol} \qquad (8).$$

The experiments carried out in the laboratory show that a 40% conversion of the feed upstream from combustion zone 120 is sufficient to reach a global methane conversion above 98%.

Warming up and reaction energy supply for partial reforming of the feed, i.e. 37.4 MWth, are provided by conduction through walls 140 between combustion zone 120 and pre-reforming zone 130. This pre-reforming step results in a reformed feed 14 whose composition in molar fractions is given in Table 3 below.

TABLE 3

| | |
|---|---|
| Methane | 0.169 |
| Ethane | 0.000 |
| Propane | 0.000 |
| n-Butane | 0.000 |
| n-Pentane | 0.000 |
| Nitrogen | 0.004 |
| Oxygen | 0.000 |
| H$_2$O | 0.244 |
| Helium | 0.000 |
| Argon | 0.000 |
| Carbon | 0.000 |
| CO$_2$ | 0.051 |
| CO | 0.087 |
| H$_2$ | 0.444 |

The steam injected into pre-reforming zone 130 is such that it enables fluidization in zone 120, and it is unnecessary here to complete with an additional stream 15. The reformed feed comprises a significant fraction of CO and H$_2$. These compounds have fast combustion kinetics on contact with an oxygen carrier. This allows to reach a global methane conversion above 98%, considering the composition of combustion effluent 12 given in Table 4 hereafter.

TABLE 4

| | |
|---|---|
| Methane | 0.003 |
| Ethane | 0.000 |
| Propane | 0.000 |
| n-Butane | 0.000 |
| n-Pentane | 0.000 |
| Nitrogen | 0.003 |
| Oxygen | 0.000 |
| H$_2$O | 0.766 |
| Helium | 0.000 |
| Argon | 0.000 |
| Carbon | 0.000 |
| CO$_2$ | 0.228 |
| CO | 0.000 |
| H$_2$ | 0.000 |

The residual methane represents 159 kg/h, i.e. a 98.9% conversion. This conversion level reduces the risks of formation of an explosive atmosphere at the outlet of zone 120, and it generates enough energy on contact with the oxygen-carrying solid to operate the process satisfactorily with a temperature above the 900° C. of the experiment. In relation to Example 1 according to the prior art, implementation of the invention allows combustion of the natural gas on a manganese oxide by chemical looping combustion to be operated efficiently.

Example 3 According to the Invention

Like Example 2, Example 3 is based on a plant as described in connection with FIG. 1. The objectives set out in Example 2, i.e. the desired power, the oxygen carrier and the nature of the treated feed, are the same in this Example 3. The only difference in the implementation of Example 3 is that the gas used for pre-reforming feed 17 is not steam as in Example 2, but $CO_2$.

The rate of delivery of hydrocarbon feed 17 to pre-reforming zone 130 is also 14.9 t/h and the composition is as given in example 1. The gas used for pre-reforming feed 17 is $CO_2$ extracted from the $CO_2$ compression chain designed for transport/storage, arranged downstream from reduction zone 120. The molar ratio remains 1.4, but in this case it is expressed in $CO_2$ to carbon. This corresponds to a flow of 56.9 t/h at 160° C.

Pre-reforming zone 130 is operated at 800° C. as in Example 2. The reforming reactions and mainly those of methane are endothermic. The "dry" methane reforming reaction and its reaction enthalpy $\Delta rH$ are given below:

$$CH_4 + CO_2 \rightarrow 2.CO + 2.H_2 \quad \Delta_r H = 260 \text{ kJ/mol} \quad (9).$$

The experiments carried out in the laboratory show that a 40% conversion of the feed upstream from the combustion reactor is sufficient to reach a global methane conversion above 98%.

Warming up and reaction energy supply for partial reforming of the feed, i.e. 55.6 MWth, are provided by conduction through walls 140 between reduction zone 120 and pre-reforming zone 130. This pre-reforming step results in a reformed feed 14 whose composition in molar fractions is given in Table 5 hereafter.

TABLE 5

| | |
|---|---|
| Methane | 0.141 |
| Ethane | 0.008 |
| Propane | 0.000 |
| n-Butane | 0.000 |
| n-Pentane | 0.000 |
| Nitrogen | 0.010 |
| Oxygen | 0.000 |
| H2O | 0.092 |
| Helium | 0.000 |
| Argon | 0.000 |
| Carbon | 0.000 |
| CO2 | 0.195 |
| CO | 0.367 |
| $H_2$ | 0.187 |

The steam injected into pre-reforming zone 130 enables fluidization in zone 120, and injection of an additional gas 15 is unnecessary. The reformed feed comprises a significant fraction of CO and $H_2$. These compounds have fast combustion kinetics on contact with an oxygen carrier. This allows to reach a global methane conversion above 98%, as shown by the composition of combustion effluent 12 given in Table 6 hereafter.

TABLE 6

| | |
|---|---|
| Methane | 0.002 |
| Ethane | 0.000 |
| Propane | 0.000 |
| n-Butane | 0.000 |
| n-Pentane | 0.000 |
| Nitrogen | 0.008 |
| Oxygen | 0.000 |
| H2O | 0.443 |
| Helium | 0.000 |
| Argon | 0.000 |
| Carbon | 0.000 |
| CO2 | 0.547 |
| CO | 0.000 |
| $H_2$ | 0.000 |

The residual methane in effluent 12 represents 137 kg/h, i.e. a 99.1% conversion. This conversion level reduces the risks of formation of an explosive atmosphere and it generates enough energy on contact with the solid to operate the process satisfactorily with a temperature above the 900° C. of the experiment. In relation to the state of the art, implementation of the invention allows combustion of the natural gas on a manganese oxide by chemical looping combustion to be operated efficiently.

The invention claimed is:

1. A plant for chemical looping oxidation-reduction combustion of a gaseous hydrocarbon feed, comprising:
   a pre-reforming zone comprising a fixed catalyst for a reforming reaction, an inlet for the gaseous hydrocarbon feed, a feed point for an oxidizing reforming gas, and an outlet for a gas mixture comprising syngas,
   a reduction zone comprising an inlet configured for injecting a fluidization gas, a feed point for the gas mixture, an inlet for a redox active mass comprising particles, an outlet for a gaseous effluent, and an outlet for the redox active mass,
   an oxidation zone comprising a feed point for the redox active mass from the reduction zone, an inlet configured for injecting an oxidizing fluidization gas, an outlet for a depleted oxidizing gas, and an outlet for the redox active mass,
   wherein the pre-reforming zone and the oxidation zone or the pre-reforming zone and the reduction zone are thermally integrated in the same reactor while being separated by at least one thermally conductive separation wall, and
   the reactor comprises at the center thereof the reduction zone or the oxidation zone surrounded by a rigid casing, the casing comprising, from the center to the periphery of the reactor, a first layer made of a thermally conductive anti-abrasion material and of a second layer made of a refractory material, the pre-reforming zone being integrated in the casing.

2. A plant as claimed in claim 1, wherein the reactor comprises the pre-reforming zone and the reduction zone.

3. A plant as claimed in claim 1, wherein the reactor comprises the pre-reforming zone and the oxidation zone.

4. A plant as claimed in claim 1, wherein the thermally conductive anti-abrasion material comprises at least the first layer of the casing.

5. A plant as claimed in claim 1, wherein the pre-reforming zone further comprises at least one enclosure delimited by a wall comprising a first part in contact with the reduction zone and a second part in contact with the first layer or the second layer of the casing, and wherein the first part in contact with the reduction zone makes up the thermally conductive anti-abrasion material.

6. A plant as claimed in claim 1, wherein the pre-reforming zone further comprises a set of metal tubes arranged vertically around the reduction zone or the oxidation zone.

7. A plant as claimed in claim 1, wherein the fixed catalyst comprises a fixed bed of a catalyst comprising particles.

8. A plant as claimed in claim 1, wherein the fixed catalyst comprises a fixed internal contained in the pre-reforming zone.

9. A plant as claimed in claim 1, wherein the at least one thermally conductive separation wall has a thermal conductivity greater than 0.1 W/(m·K).

10. A method for chemical looping oxidation-reduction combustion of a gaseous hydrocarbon feed implemented in a plant as claimed in claim 1, comprising:

sending the gaseous hydrocarbon feed to a pre-reforming zone comprising a fixed catalyst so as to perform catalytic reforming of the hydrocarbon feed on contact with an oxidizing reforming gas and to produce a gas mixture comprising syngas, sending the gas mixture to a fluidized-bed reduction zone to perform combustion of the gas mixture on contact with a redox active mass comprising particles, oxidizing the particles from the reduction zone by contacting with an oxidizing gas stream in a fluidized-bed oxidation zone, and transferring heat of a fluidized bed from the reduction zone or the oxidation zone to the pre-reforming zone by means of at least one thermally conductive wall separating the pre-reforming zone from the reduction zone or the oxidation zone.

11. A method as claimed in claim 10, wherein the temperature of the fluidized bed in the fluidized-bed reduction zone and in the fluidized-bed oxidation zone, circulating between the fluidized-bed reduction and the fluidized-bed oxidation zones, ranges between 700° C. and 1100° C., and the heat transferred from the fluidized bed to the pre-reforming zone is such that the temperature in the pre-reforming zone is favorable to the catalytic reforming reaction of the gaseous hydrocarbon feed.

12. A method as claimed in claim 10, wherein the gaseous hydrocarbon feed comprises methane, and wherein reforming of the gaseous hydrocarbon feed within the pre-reforming zone is operated in the presence of a methane reforming catalyst comprising nickel.

13. A plant as claimed in claim 7, wherein the fixed catalyst comprises nickel.

14. A plant as claimed in claim 8, wherein the fixed catalyst comprises a nickel foam or a set of fins or baffles arranged on an inner face of the pre-reforming zone.

15. A plant as claimed in claim 9, wherein the at least one thermally conductive separation wall has a thermal conductivity greater than 1 W/(m·K).

16. A method as claimed in claim 10, wherein the oxidizing reforming gas comprises steam or $CO_2$.

17. A method as claimed in claim 11, wherein the temperature in pre-reforming zone ranges between 650° C. and 1000° C.

* * * * *